UNITED STATES PATENT OFFICE.

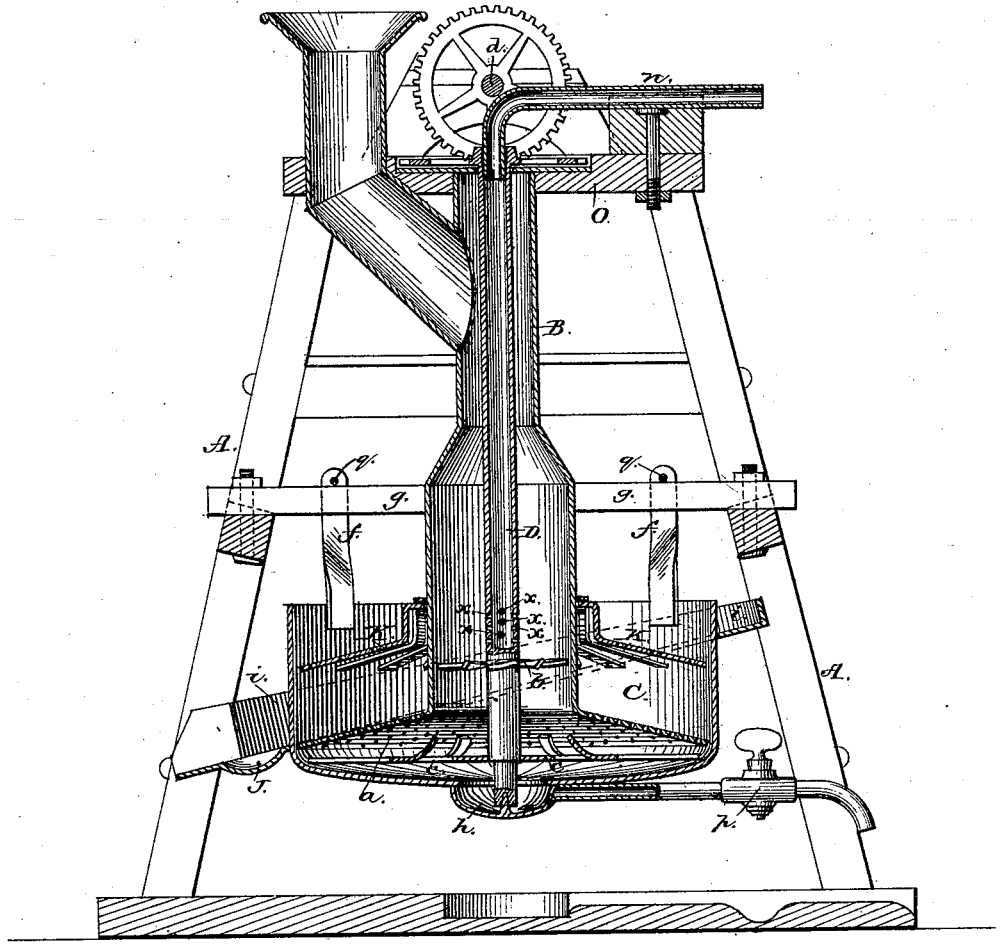

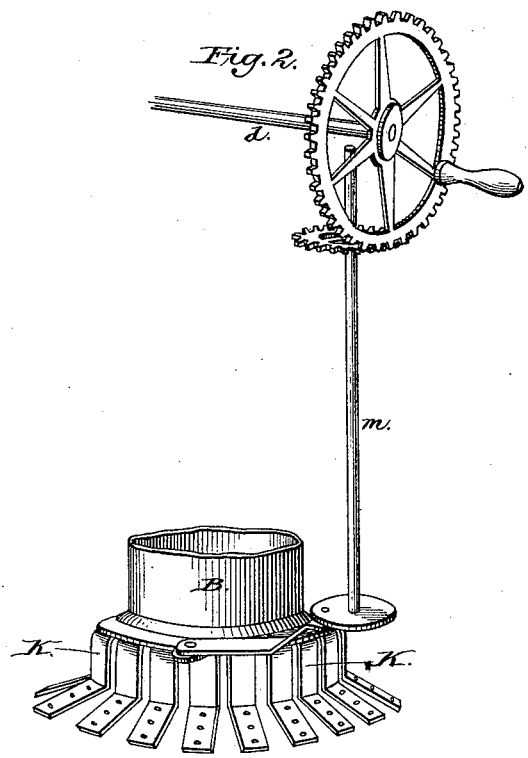

WALTER S. SHOTWELL, OF SAN FRANCISCO, CALIFORNIA.

IMPROVEMENT IN ORE-AMALGAMATORS.

Specification forming part of Letters Patent No. 202,595, dated April 16, 1878; application filed November 20, 1877.

*To all whom it may concern:*

Be it known that I, WALTER S. SHOTWELL, of San Francisco, in the county of San Francisco, and in the State of California, have invented new and useful Improvements in Gold and Silver Separators and Amalgamators; and do hereby declare that the following is a full, clear, and exact description thereof.

The class to which my invention belongs is that which extracts the gold and silver from the earths in which they are found by the use of quicksilver.

In the annexed drawings, forming a part of this specification, A is a wooden frame, having a broad platform, O, on its top. B is a hollow metallic column, which becomes larger in passing downward from the platform O, yet having a side extension, which starts below the platform O, passing up through the platform O and terminating in a funnel at its top. The lower end of the metallic column B abruptly widens into a drooping flange, $a$, numerously perforated with holes, and coated on its upper side with quicksilver, the flange extending quite to the diameter of the copper basin C, near the bottom of which it is placed.

D is a hollow shaft passing through the metallic column B at its center, from top to bottom, and near its lower end will be seen numerous openings, $x\ x\ x$, &c. A little lower down is a screw, $b$, secured to the hollow shaft D, said screw being not unlike the propeller of a steam-ship, the leaves of which extend quite out to the diameter of the metallic column B. Farther down, and secured also to the hollow shaft D, is a flange or agitator, $c$, having numerous arms at its outer edge, while the hollow shaft itself terminates with a socket, which sets over a pin secured to the center of the small basin $h$ at the bottom of the large copper basin C, and whose use will be explained hereinafter.

It will be seen that the agitator $c$ is placed between the bottom of the copper basin C and the perforated flange $a$ at the bottom of the metallic column B. The upper end of the hollow shaft D passes through the platform O at top of frame-work A, and is there connected by gearing to the horizontal shaft $d$, from which it receives its motion.

The copper basin C is held in position by means of the metal rods $f\ f\ f\ f$. These, passing through the cross-timbers $g\ g$, are secured by rods $q\ q$ passing through holes at the upper ends of the metal rods $f\ f\ f\ f$. Out of the small basin $h$, at the bottom of the copper basin C, is a pipe leading outward, having a cut-off, $p$, at its outer end, and surrounding the copper basin C is a copper trough, $i$, slanting downward to one side, at the lowest point of which is a depression, $j$, whose use will hereinafter be stated, while at this point also the outer sides of the trough $i$ open to allow anything to pass off.

Right here I will mention that the insides of the copper basin C, and the small basin $h$ at its bottom, and the outside of the copper basin C above the trough $i$, and the inside of the trough $i$ surrounding the copper basin C, and the inside of the depression $j$ in the trough $i$, all are lined with a coating of quicksilver, which forms a part of their composition, the utility of which will be explained hereinafter.

Around the metallic column B, and just above the perforated flange $a$ at its lower end, is an agitator, $k$, composed of numerous perforated arms extending outward quite to the sides of the copper basin C, but below its top. This agitator does not revolve, but oscillates around the metallic column B, receiving its motion through a connecting-rod attached to a small crank at the bottom of the vertical shaft $m$, and in turn its motion is derived from the horizontal shaft $d$ through the bevel-gearing, secured by a rest on top of the platform O.

In the upper end of the hollow shaft D a pipe, $n$, is inserted, around which the hollow shaft D revolves, the said pipe $n$ bending outward at right angles to the horizontal shaft $d$, and firmly secured to the platform O.

Having now named the various parts of my invention, I will proceed to explain its operation. The copper basin C is filled with quicksilver to a point between the perforated flange at the bottom of the metallic column B and the oscillating agitator $k$ surrounding the metallic column B. Water is now allowed to flow into the hollow shaft D through the bent pipe $n$, and, descending, finally discharges itself into the metallic column B through the openings $x\ x\ x$, &c., just above the bladed screw $b$. The water now rises in the metallic column B to a height corresponding to the specific gravity of both fluids, and, if no more water is let in, will remain at this point so long as the height of quicksilver remains the same. The earths are next fed into the funnel at the upper end of the side extension of the metallic column B, and pass downward to the bottom of the column of water, and resting on the surface of the quicksilver in the copper basin C, and as water, in a continuous strain, is let in, more than counterbalancing the weight of quicksilver, it readily finds an exit through the perforations in the flange $a$, the earths following closely, and thoroughly broken up and dissolved by the rapid revolutions of the screw $b$ and agitator $c$. At this point the precious metals are amalgamated in the quicksilver, the heavier particles settling into the small basin $h$ in the bottom of the copper basin C. The earths, now being free, lie in the water on top of the quicksilver outside of the metallic column B, but are forced upward by the earths coming constantly from below, until they reach the top of the copper basin C, and flow over into the trough $i$ surrounding the copper basin C. Before reaching this point, however, the oscillating agitator $k$ does its work by loosening up the earths, so that any particles of quicksilver that may adhere to the earths will either fall back into the main body, or be picked up by the arms, which are covered with a coating of quicksilver, the same as the lining of copper basin C. In the passage of the water and earths into the trough $i$ over the coatings of quicksilver, any particles of quicksilver that may have escaped from the copper basin C with the earths are now picked up, and find a receiver to catch them in the depression $j$ at the mouth of the trough $i$, while the earths and water readily pass away.

The cut-off $p$ in the pipe leading from the small basin $h$ at the bottom of the copper basin C is for the purpose of drawing off the quicksilver or amalgam at will.

The metal rods $f f f f$ attached to the copper basin C, with their appliances for disconnecting, are for the purpose of taking the copper basin C out at will, for cleaning or other purpose.

Having thus fully described my invention, with its application, what I claim as new, and desire to secure by Letters Patent, is as follows:

1. The copper-bottomed amalgamated quicksilver-containing pan C, the vertical hollow feed-column B, extending to near the bottom, provided with the projecting perforated disk or flange $a$, in combination with the shaft D, rotating within the column, and provided with the screw $b$ and the agitator $c$, beneath the disk $a$, the whole constructed and operated substantially as herein described.

2. In combination with the containing-pan C and the vertical hollow feed-column B, with its bottom disk $a$, the hollow perforated shaft D, to receive a column of water and discharge it into the earthy contents of the column B above the screw $b$, substantially as and for the purpose herein described.

3. In combination with the pan C, column B, with its flange $a$, and the interior rotating shaft D, with its screw and agitator, as shown, the oscillating amalgamated agitator $k$, situated above the perforated flange $a$, and operating substantially as and for the purpose herein described.

4. The copper-bottomed quicksilver-containing pan C, having a central amalgam-concentrating depression, $h$, in combination with the upwardly-projecting feed-column B and shaft D, placed centrally above the depression, substantially as shown, and for the purpose herein specified.

5. In combination with the quicksilver-containing pan C and the column B, and hollow rotating shaft D, as shown, the surrounding inclined trough $i$, with its depression $j$ and discharge, substantially as and for the purpose herein described.

WALTER S. SHOTWELL.

Witnesses:
WILLIAM HARNEY,
H. H. SHEPARD.